United States Patent [19]

Thomas

[11] Patent Number: 5,404,766
[45] Date of Patent: Apr. 11, 1995

[54] ROTATING ROUND DIAL AIRCRAFT ENGINE INSTRUMENTS

[75] Inventor: Harold W. Thomas, Phoenix, Ariz.

[73] Assignee: Honeywell Inc., Minneapolis, Minn.

[21] Appl. No.: 955,074

[22] Filed: Oct. 1, 1992

[51] Int. Cl.⁶ .............................................. G01D 7/02
[52] U.S. Cl. ................................... 73/866.3; 340/959; 340/963
[58] Field of Search .................... 73/116, 117.2, 117.3, 73/866.3, 178 T, 178 R, 115, 4 R; 340/959, 963-972; 364/427

[56] References Cited

U.S. PATENT DOCUMENTS

| | | | |
|---|---|---|---|
| 3,077,110 | 2/1963 | Gold | 340/959 |
| 3,192,503 | 6/1965 | Lang | 340/959 |
| 3,677,090 | 7/1972 | Kolb | 73/115 |
| 3,961,520 | 6/1976 | Modgling | 73/4 R |
| 4,051,712 | 10/1977 | Zias et al. | 73/4 R |
| 4,269,058 | 5/1981 | Richman | 73/4 R |
| 4,664,635 | 5/1987 | Hermann | 73/4 R |

*Primary Examiner*—Robert Raevis
*Attorney, Agent, or Firm*—D. E. Jepsen; R. E. Champion

[57] ABSTRACT

An apparatus and method for displaying an engine performance parameter are provided wherein the scale for reading the value of the engine performance parameter is rotated as required in order that a pointer showing the value of the engine performance parameter appears at a desired clock position on a display when the value of the engine performance parameter is equal to a predetermined value, such as a takeoff thrust value.

7 Claims, 6 Drawing Sheets

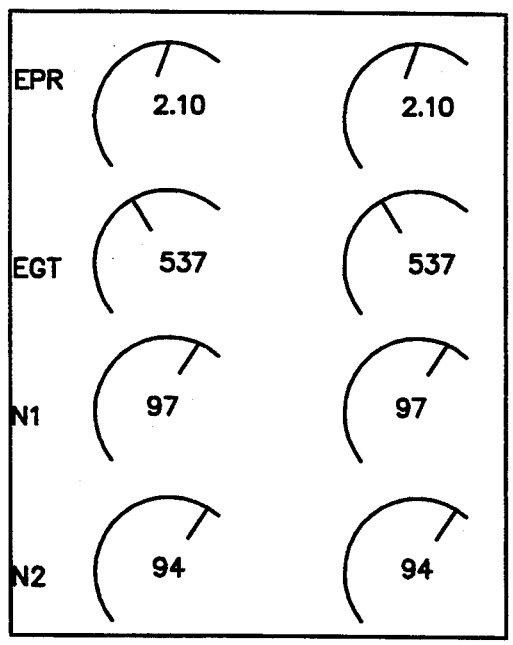
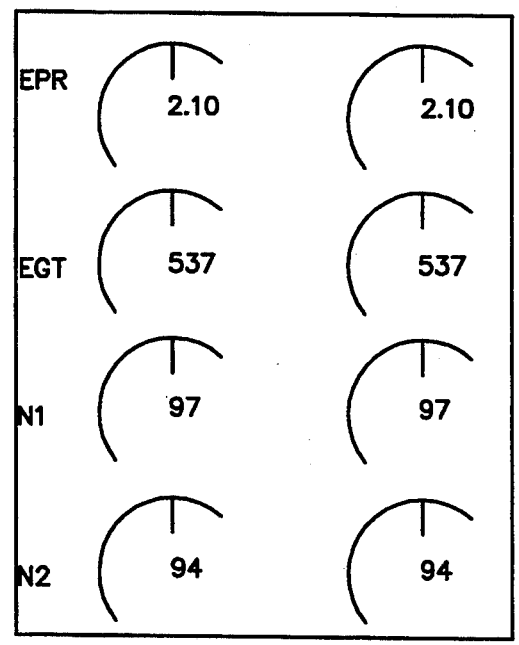
*Fig. 5A*  *Fig. 5B*
PRIOR ART

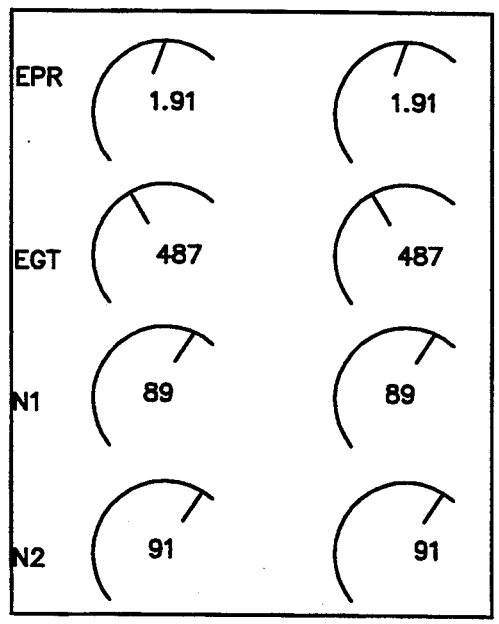 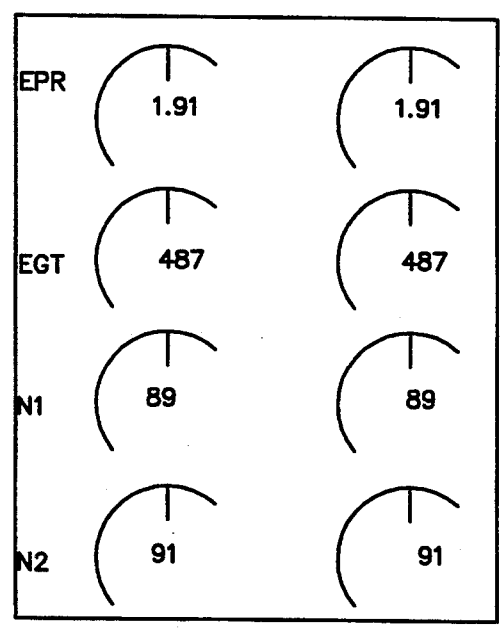
Fig.6A
PRIOR ART
Fig.6B

ROTATING ROUND DIAL AIRCRAFT ENGINE INSTRUMENTS

BACKGROUND OF THE INVENTION

1. Field of the Invention

This invention pertains in general to aircraft engine instruments and more particularly to an apparatus and method for rotating the scale of such instruments to provide alignment of the pointers for a particular thrust setting in order to enable detection of erroneous readings.

1. Description of the Prior Art

Aircraft turbine engine performance parameters such as engine pressure ratio, EPR, exhaust gas temperature, EGT, and revolutions per minute, RPM, are commonly represented on round gauges wherein the reading is obtained by noting the position of a pointer symbol with respect to a scale which is displayed around the circumference of the circular dial. Depending on the particular thrust setting selected, the angular position, or clock position, of the needle or pointer with respect to the circular scale for one engine parameter, such as EPR, may or may not coincide with the angular position of the pointer with respect to the scale for another performance parameter such as EGT.

Various color bands and marker bugs have been used to indicate the desired reading of a particular performance parameter for a given thrust setting, such as a bug for marking the target EPR setting for takeoff. In order to determine engine performance using these circular dial instruments separate readings must be made for each performance parameter with respect to its corresponding scale. Under certain failure modes an erroneous reading from one performance parameter may not be recognizable without specific detailed reference to the remaining readings with respect to their corresponding scales. During critical flight modes such as takeoff, the time required to discern an erroneous engine parameter reading may be sufficient to cause a delayed reaction to the erroneous reading, and in some cases may be a significant cause of an aircraft accident.

It would therefore be desirable to have an aircraft engine instrument system wherein the angular position, or relative clock position, of the needles or pointers for the various aircraft engine performance parameters are aligned to be the same relative clock position for a particular thrust setting, thereby allowing an early detection of a failed engine or erroneous reading by a quick glance at the needles which should be aligned under normal conditions.

SUMMARY OF THE INVENTION

In accordance with the present invention an aircraft engine instrument display apparatus is provided wherein a sensor means for generating a signal representative of an engine performance parameter and a reference means for generating a predetermined desired value of the engine performance parameter are coupled to a symbol generator for generating drive signals representative of the performance parameter value and the predetermined desired value. The symbol generator means is coupled to a display means for displaying the performance parameter symbol and a reference scale, wherein the reference scale is rotated as required to provide the predetermined desired value at a predetermined clock position with respect to the reference scale.

The invention will be described more fully by way of example with respect to the accompanying drawings wherein:

BRIEF DESCRIPTION OF DRAWINGS

FIGS. 5A and 5B illustrate the normal full thrust engine instrument readings for a prior art engine instrument system and the system of the present invention respectfully; and FIGS. 6A and 6B illustrate the engine instrument readings for a derated takeoff utilizing the prior art engine instrument readings and the engine instrument readings of the present invention respectfully.

DESCRIPTION OF THE PREFERRED EMBODIMENT

Figure 2:
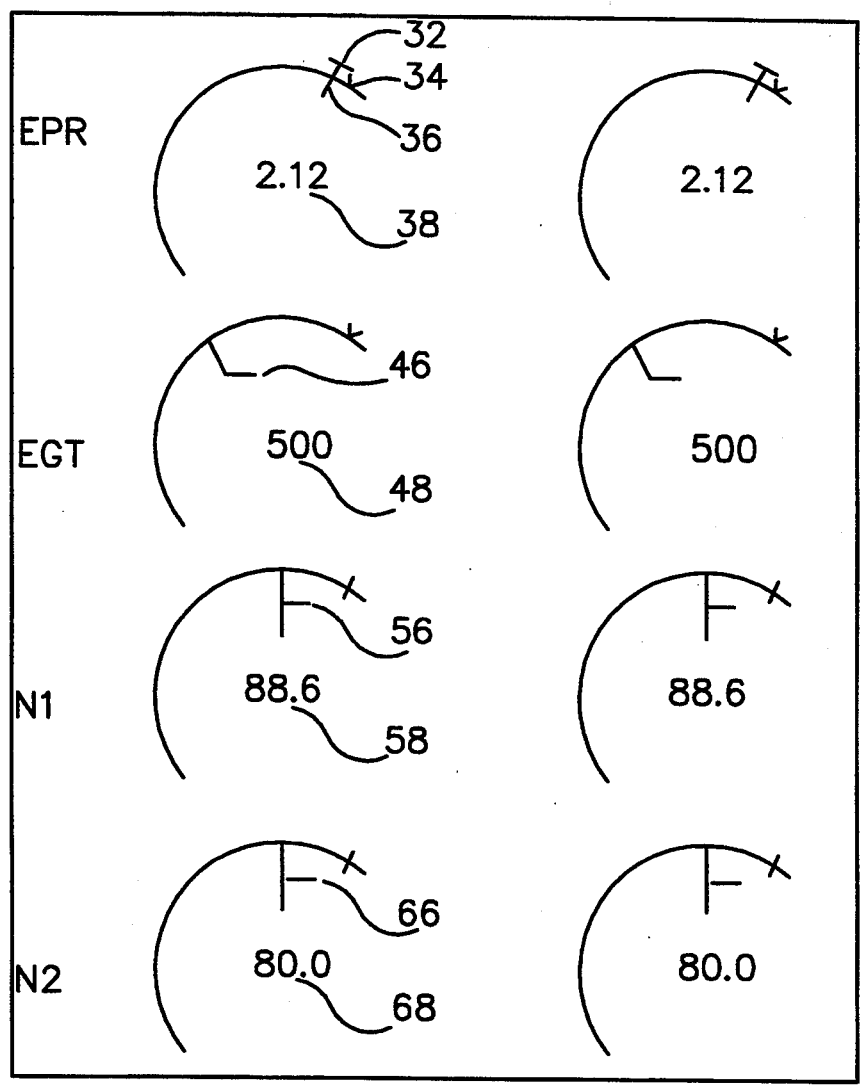
FIG. 2 is a diagram illustrating typical abnormal engine performance readings using a prior art system.

FIG. 2 illustrates a typical set of engine instrument readings utilizing a prior art system wherein the EPR readings of 2.12 appear to align with the target setting as illustrated by the alignment of pointer 36 with target symbol 32. However, the remaining engine instrument readings are not those which would correspond to an actual EPR reading of 2.12. The only method of determining this erroneous EPR reading is to look at the actual readings in question, that is EGT equal to 500, N1 equal to 88.6, N2 equal to 80.0 and realize that these readings are significantly lower then they should be for an EPR reading of 2.12.

Figure 4:
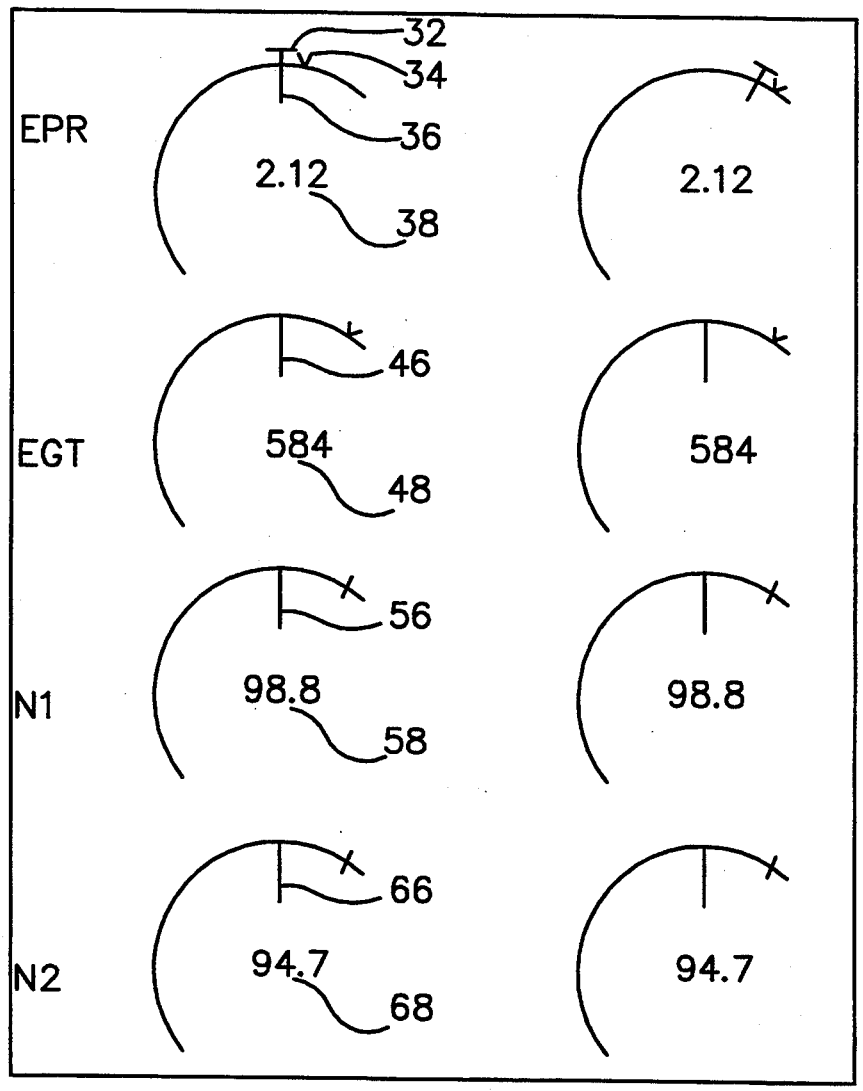
FIG. 4 illustrates a nominal performance reading utilizing the system of the present invention.

Utilizing the method and system of the present invention, the outer scales or reference scales of the various engine instruments are rotated so that at a particular thrust setting the corresponding pointer positions for needles 36, 46, 56 and 66 are at the same relative clock position for the corresponding instruments as shown in FIG. 4. Utilizing this system the pilot may recognize with a very brief glance that all of the engine performance parameters are approximately correct for the given desired EPR or thrust setting.

Figure 3:
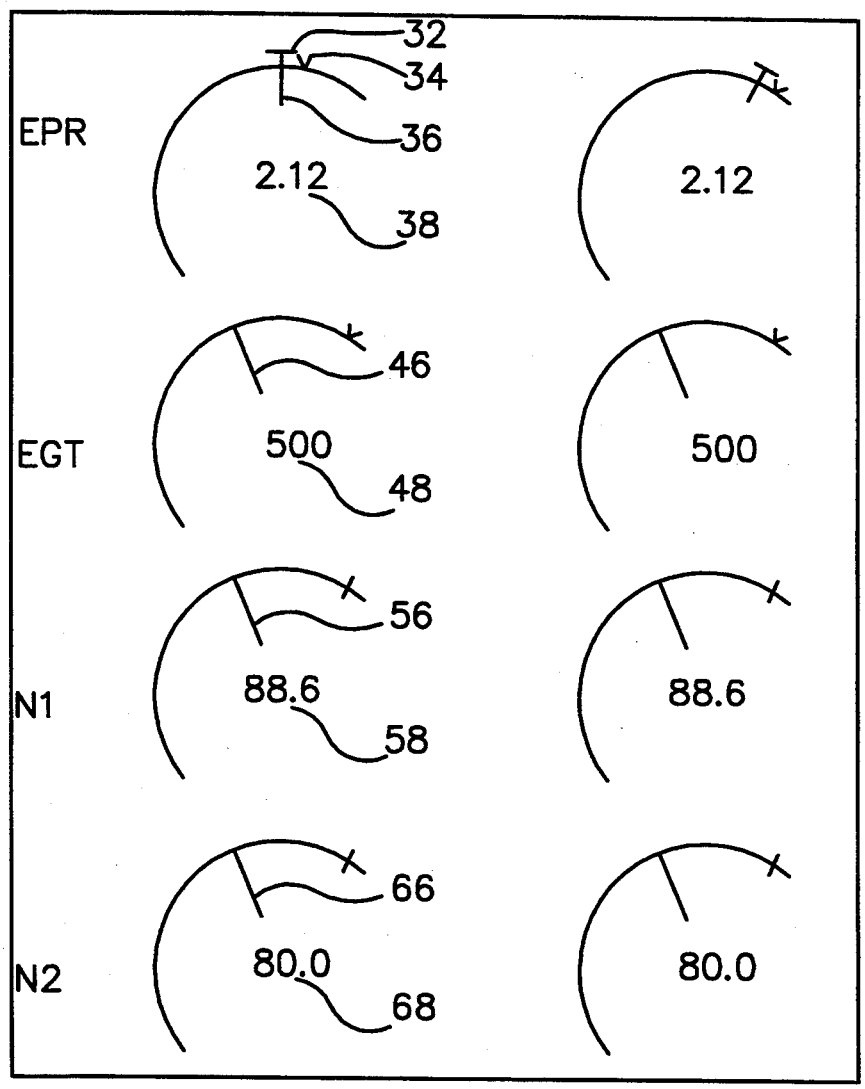
FIG. 3 illustrates the same readings as those shown in FIG. 2 utilizing the system of the present invention.

As can be seen in FIG. 3, the particular failure in question such as an erroneously high EPR reading may be easily detected by noting the relative clock positions of pointers 46, 56, and 66. These remaining pointers are substantially different from the desired 12 o'clock position for the respective pointers. This system therefore provides a rapid means for the pilot to detect an erroneous engine instrument reading at a glance without having to determine a specific numerical reading with respect to a scale for any given case.

The example illustrated in FIGS. 2 and 3 represents a case where the EPR reading is erroneously high, such as for example in the case where the inlet probe for the engine has been blocked by ice or other foreign matter accumulations. In this case the engine instrument representative of engine pressure ratio or EPR reads the desired target thrust setting of 2.12 at a lower actual thrust output setting for the engine. This can be detected by observing the remaining performance instruments such as EGT, N1, and N2.

However, the erroneous reading may not be easily discernable utilizing the prior art system of FIG. 2, as the specific readings themselves must be compared to a numerical desired value in order to detect the erroneous EPR reading. The system of the present invention, as illustrated in FIG. 3, clearly shows that the EPR reading of 2.12 is not correct when compared to the remaining performance instrument readings of EGT, N1 and N2. This difference is discerned not by determining that a specific numerical reading is incorrect, but by observing that the clock positions of pointers 46, 56, and 66 are not at the desired 12 o'clock position which they should be to correspond with the 12 o'clock position of needle 36 which indicates the desired EPR reading.

Normal full thrust takeoff engine instrument readings are shown in FIGS. 5A and 5B. As shown in FIG. 5A, the actual appropriate or desired readings on the various engine instruments do not coincide with a particular relative clock position. The system of the present invention, as illustrated in FIG. 5B essentially rotates the outer scales in order that the desired and normal respective instrument readings result in the identical, or nearly identical, relative clock position of the needles showing the EPR, EGT, N1 and N2 readings.

A further illustration is shown in FIGS. 6A and 6B for a normal derated takeoff. Again, the various engine instrument readings, although normal, produce different relative clock positions of the specific pointers under the prior art system of FIG. 6A. The system of the present invention, on the other hand, again rotates the scales of the individual instruments to provide the same desired 12 o'clock position of the needles for the different engine instrument parameters for the desired thrust setting.

With appropriate calculations to provide the desired instrument readings, the same relative clock position, such as the 12 o'clock position, may be obtained for any desired thrust setting. For example, the full thrust readings of FIG. 5B appear to be the same as the derated thrust setting readings of FIG. 6B, even though the numerical readings are in fact different for the two thrust settings. As with present engine instrument systems, the desired thrust setting may be either pilot selected or determined based on engine parameters by an external system.

Figure 1:
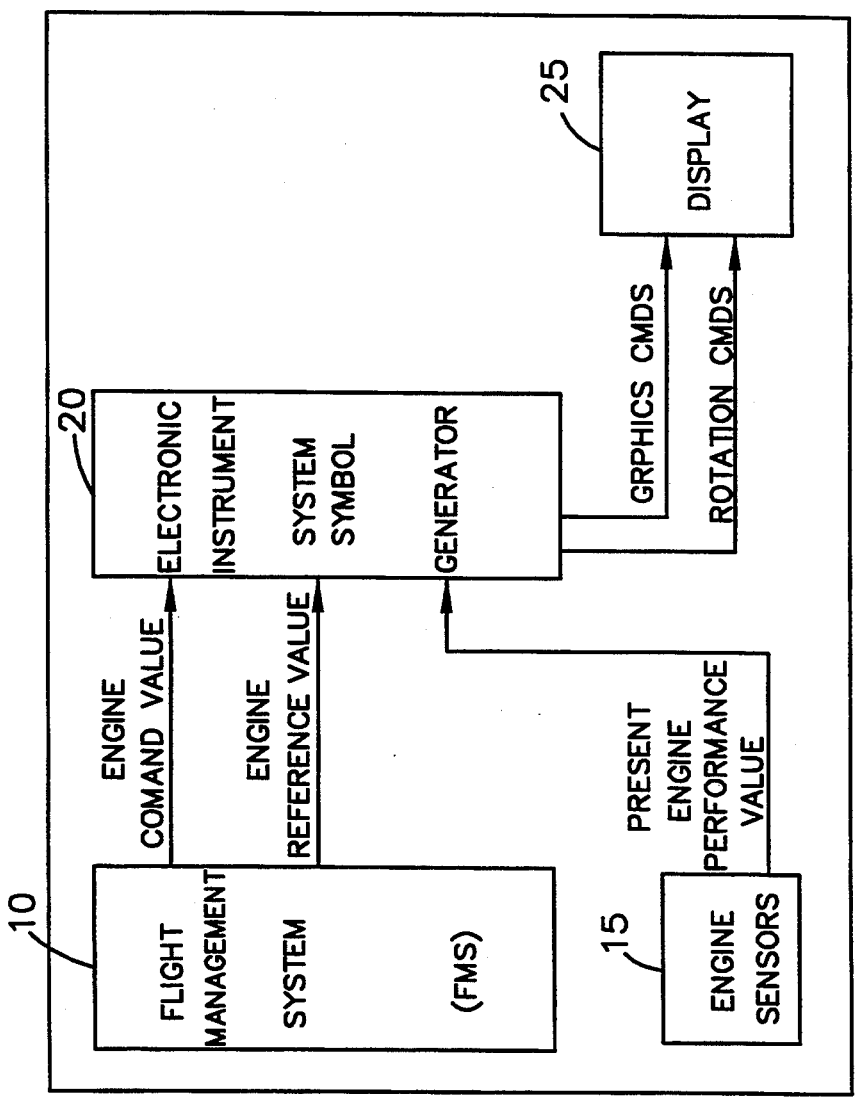
FIG. 1 is a block diagram of the system of the present invention.

As illustrated in FIG. 1, the system of the present invention includes engine sensors 15 coupled to an electronic instrument system symbol generator 20, as well as a flight management or other computer system 10 coupled to the electronic instrument system symbol generator 20. The electronic instrument system symbol generator 20 provides the required computations for generating both the actual instrument reading for the needles in question as well as the computations required to rotate the outer scales the desired amount to result in the alignment of the needles to the same clock position for the various instruments in question. Symbol generator 20 provides the required signals to display system 25.

While the system and method of the present invention have been described for a particular application, this description is not to be taken as a limitation of the claims. Alternative embodiments may be implemented using other desired clock positions, engine parameters or flight modes without departing from the scope of the invention.

What is claimed is:

1. An engine performance display apparatus for displaying an engine performance parameter for an engine, said display apparatus comprising:

sensor means for generating a signal representative of said engine performance parameter, reference means for generating a signal representative of a predetermined value of said engine performance parameter, symbol generator means, coupled to said sensor means and to said reference means, for generating drive signals representative of said engine performance parameter and said predetermined value, and display means coupled to said symbol generator means, for displaying a performance parameter symbol having an angular position proportional to said engine performance parameter and a corresponding reference scale wherein said reference scale is rotated such that the angular position of said performance parameter symbol appears in a predetermined desired relative clock position on the face of said display means when said engine performance parameter is equal to said predetermined value.

2. The display apparatus of claim 1 wherein said engine performance parameter is engine pressure ratio.

3. The display apparatus of claim 2 wherein said predetermined value is for a takeoff thrust setting.

4. The display apparatus of claim 3 wherein said predetermined desired relative clock position is the 12 o'clock position.

5. An engine performance display apparatus for displaying first and second engine performance parameters for an engine, said display apparatus comprising:

sensor means for generating first and second signals representative of said first and second engine performance parameters, respectively, reference means for generating first and second predetermined values of said first and second engine performance parameters, respectively, symbol generator means, coupled to said sensor means and to said reference means, for generating drive signals representative of said first and second engine performance parameters and of said first and second predetermined values, and display means, coupled to said symbol generator means, for displaying first and second performance parameters symbols having angular positions respectively proportional to said first and second engine performance parameters and for displaying corresponding first and second reference scales, wherein said second reference scale is rotated such that the angular position of said second performance parameter symbol with respect to said display means is approximately equal to the angular position of said first performance parameter symbol with respect to said display means, when said first engine performance parameter is equal to said first predetermined value and said second engine performance parameter is equal to said second predetermined value.

6. The display apparatus of claim 5 wherein said first and second engine performance parameters are engine pressure ratio and exhaust gas temperature, respectively.

7. A method of displaying an engine performance parameter for an engine comprising the steps of:

sensing said engine performance parameter, generating a first signal representative of a predetermined value of said engine performance parameter, generating a second signal representative of the value of said engine performance parameter, generating a third signal representative of the angular position of a scale for said engine performance parameter such that a pointer responsive to said second signal is displayed at a predetermined clock position on a display when said engine performance parameter is equal to said predetermined value.

* * * * *